United States Patent
Stabb et al.

(10) Patent No.: US 7,134,094 B2
(45) Date of Patent: Nov. 7, 2006

(54) AUTOMATIC ASSIGNING OF SHORTCUT KEYS

(75) Inventors: Charles W. Stabb, Seattle, WA (US); David A. Matthews, Seattle, WA (US); Sarah E. Schrock, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/034,745

(22) Filed: Jan. 14, 2005

(65) Prior Publication Data

US 2006/0161889 A1    Jul. 20, 2006

(51) Int. Cl.
*G06F 3/00* (2006.01)
*G06F 13/12* (2006.01)

(52) U.S. Cl. ............... 715/827; 715/825; 715/847; 710/8; 710/62; 710/73

(58) Field of Classification Search ............ 710/8, 710/63, 73; 715/700, 810, 825, 827, 847
See application file for complete search history.

(56) References Cited

U.S. PATENT DOCUMENTS

| | | | | |
|---|---|---|---|---|
| 5,870,319 | A * | 2/1999 | Thornton et al. | 708/160 |
| 6,114,978 | A * | 9/2000 | Hoag | 341/23 |
| 6,201,540 | B1 * | 3/2001 | Gallup et al. | 715/764 |
| 2002/0084919 | A1 * | 7/2002 | Green | 341/22 |

OTHER PUBLICATIONS

Maria Langer, Mac os X Panther, Visual Quickstart Guide, Chapter 11, pp. 340-342, 2004.
Scott Kelby, Mac os X KillerTips, The ultimate collection of Mac OS X sidebar tips (without the sidebars)—Chapter 10, pp. 195-201.
Maria Langer, Mac os X Panther, Chapter 2, p. 27, "To use a keyboard shortcut", Chapter 4, p. 99 "Standard Shortcut Keys for Exposé", p. 108 "Favorites", p. 107 "To make Favorites more accessible", and Chapter 11, p. 341 "To view a specific URL", 2004.
Scott Kelby, Mac os X KillerTips—Chapter 1, p. 9, Chapter 4, p. 88, "Creating Your Own Keyboard Shortcuts", Chapter 7, p. 134 "Creating Your Own Keyboard Shortcuts", Chapter 8, p. 140 "Shortcut to your Applications", p. 153 "The Secret Screen Capture Shortcut", Chapter 1, p. 9 Using "Favorites" in Panther, and Chapter 8, p. 145 "The Panther Trick for Getting to your Favorites", 2004.

* cited by examiner

*Primary Examiner*—Fritz Fleming
*Assistant Examiner*—Alan S. Chen
(74) *Attorney, Agent, or Firm*—Banner & Witcoff, Ltd.

(57) ABSTRACT

Automatic assignment of shortcut keys for launching applications or for providing other commands is provided based on the position of corresponding application listings or shortcuts in a menu. The menu may include an applications menu, such as a start menu. The menu may also include an application launch bar listing applications that may be launched therefrom by selecting the respective application, or by entering shortcut keys that are automatically assigned based on the position of the application listing on the launch bar. Methods are provided for assigning application launch shortcut keys, for identifying assigned shortcut keys, for modifying shortcut keys, and for using shortcut keys for instantiating or switching applications.

18 Claims, 12 Drawing Sheets

SHORTCUT KEYS DATA STRUCTURE 400

USER 1  410

START MENU (306)  412

| POSITION 414 | DESCRIPTION 416 | SHORTCUT KEYS 418 |
|---|---|---|
| 1 | APP. 1 | WIN + 1 |
| 2 | APP. 3 | WIN + 2 |
| 3 | APP. 2 | WIN + 3 |
| 4 | APP. 4 | WIN + 4 |
| 5 | CTRL PANEL | WIN + 5 |
| 6 | SLEEP | WIN + 6 |

USER 2  420

LAUNCH BAR (502)  422

| POSITION 424 | DESCRIPTION 426 | SHORTCUT KEYS 428 |
|---|---|---|
| 1 | APP. 7 | WIN + 1 |
| 2 | MY DOCS | WIN + 2 |
| 3 | APP. X | WIN + 3 |
| 4 | APP. 4 | WIN + 4 |
| 5 | APP. 1 | WIN + 5 |
| 6 | Unassigned | WIN + 6 |

Figure 4

AUTOMATIC ASSIGNING OF SHORTCUT KEYS

FIELD OF THE INVENTION

The present invention relates to assigning shortcut keys on a computer system. In particular, the present invention relates to methods, software, computer systems and data structures for assigning shortcut keys.

BACKGROUND OF THE INVENTION

Computer shortcut keys (also known as hotkeys) are hardware-driven commands that permit a user to enter commands quickly into a computer, and/or to navigate the computer. For instance, conventional keyboard shortcut keys are one or more keyboard keys that correspond to entry of a command when activated. Some known examples of keyboard shortcut keys include selection of the "shift" key on conventional keyboards along with another key(s), such as selection the shift+delete or shift+end keys. Other examples of shortcut keys include buttons assigned to a mouse, gestures associated with a touch-sensitive pad, buttons on a personal digital assistant (PDA), etc., or combinations thereof. In general, shortcut keys are designed to help shorten the time required to perform frequently used commands. They may be pre-determined for the computer system and/or for certain applications, and they may be assignable by the user.

Conventional computer applications present commands to the user in a menu or toolbar, from which the user can select the desired command. The menus often show a pre-defined shortcut that is associated with each command in the menu. For example, many applications assign the keyboard keys Control+S as a shortcut for the command "Save." In a menu for these applications, "Ctrl+S" may be shown to remind the user of this shortcut.

Conventional computer systems and applications permit users to assign shortcut keys for particular commands of the system or for a specific application. They do so by requiring the user to identify the desired command and to identify desired shortcut keys to be assigned thereto. Each assignment is manually entered by the user for each shortcut. Conventional methods for assigning shortcut keys are often cumbersome for the user.

Applications are launched in conventional computer systems having a graphical user interface by allowing the user to select an icon representing the application. Some systems include a start menu that lists applications installed on the computer system, or a launch bar that shows icons for applications on the system. The user launches a desired application by locating the start menu or launch bar, and then by selecting the desired application from the start menu list or launch bar. Start menus and launch bars simplify execution of the application for the user, but may be unduly cumbersome or time-consuming for frequently launched applications.

SUMMARY OF THE INVENTION

Aspects of the present invention provide automatic assignment of shortcut keys for launching applications or for providing other commands. One aspect of the present invention provides a start menu showing shortcut keys assigned to applications based on their position on the menu, in which each set of shortcut keys may cause execution of an application corresponding to its position on the menu, or that may cause another action to occur that corresponds to its position on the menu. Another aspect of the present invention includes an application launch bar identifying applications that may be launched therefrom by selecting the respective application, or by entering shortcut keys associated with the position of the application on the launch bar.

Further aspects relate to methods for assigning application launch shortcut keys in accordance with the location of a representation of the application on a graphical user interface. Additional aspects of the invention may include automatic assignment of shortcut keys and related functionality, identification of assigned shortcut keys, modification of shortcut keys, and using shortcut keys for instantiating or switching applications. In other aspects, computer-executable instructions for implementing the disclosed methods are stored on computer-readable media. These and other aspects are addressed in relation to the figures and related description.

BRIEF DESCRIPTION OF THE DRAWINGS

FIG. 4 shows data fields in a shortcut key data structure according to an embodiment of the invention that may be stored on the computer of FIG. 1.

DETAILED DESCRIPTION OF THE INVENTION

Figure 1:
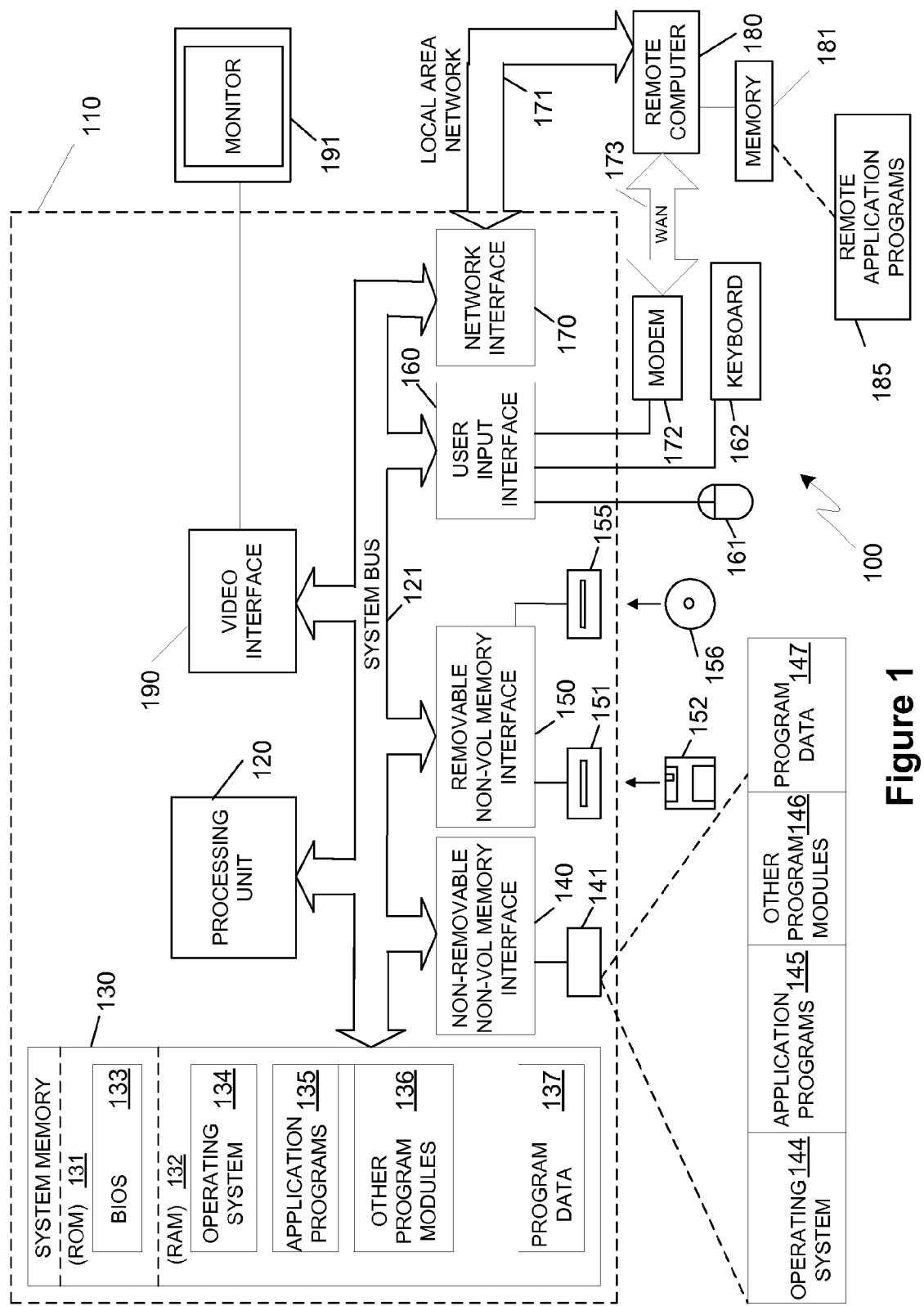
FIG. 1 is a functional diagram of a general-purpose computer supporting one or more aspects of the present invention.

Aspects of the present invention provide methods, user interface displays, computer-executable instructions, and data structures for assigning shortcut keys for launching applications and/or entering computer commands. For example, aspects of the present invention may automatically assign keyboard shortcut keys to applications based on their position in a start menu or a launch bar. In addition, the graphical user interface according to aspects of this invention may allow users to assign shortcut keys quickly and easily for launching applications or for entering other commands. Furthermore, aspects of the present invention may identify user-defined shortcut keys for launching applications or entering commands. These and other aspects of the present invention are described in detail below.

This document is divided into sections to assist the reader. These sections include the following: Terms, General-purpose Computing Environment, and Assigning Shortcut keys.

Terms

Menu (on a user interface): An ordered array of items, such as shortcuts, files, folders and tasks, which correspond to computer commands, tasks or actions. Toolbars, launch bars, option lists, etc. are examples of menus.

Pin / Unpin: To fix / unfix the listing of an item on a menu.

Registry: A database in MICROSOFT WINDOWS operating systems that contains configuration and control information for the computer system and for specific applications, as well as which stores user preferences.

Shell: An outer layer of a program that provides the user interface for commanding the computer.

Shortcut: A graphical representation, such as an icon, that links to a file, folder or task. User selection of the shortcut effectuates selection of the linked original item.

Shortcut keys or Hotkeys: Hardware-driven commands that permit a user to enter commands quickly into a computer, and/or to navigate the computer. The hardware-driven commands may include selection of a shortcut, an original file or folder, or a task. The plural term shortcut keys as used herein may mean a single user-selectable hardware device, such as a single key or button, or a plurality of user-selectable hardware devices, such as a combination of keys or buttons.

Start menu: An ordered array of running and/or available applications, folders and/or selectable tasks, such as settings and shutdown tasks.

Task: A specific action or set of actions to be performed by the computer.

User Mode: The nonprivileged processor mode in which application code runs, including protected subsystem code.

General Purpose Computing Environment

In accordance with aspects of the present invention, a graphical user interface (GUI) is provided on a computer for displaying output on the system's monitor and for managing user input. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As an example for illustrating aspects of the present invention, a system GUI is discussed, which may include an operating system GUI such as the GUI of a MICROSOFT WINDOWS operating system that may include the Win 32 subsystem (Win32). In these examples, the Win32 subsystem may have exclusive responsibility for displaying output on the system's monitor and for managing user input. Architecturally, this means that the other modules may need to call Win32 subsystem functions to produce output on the display. It also means that the Win32 subsystem may need to pass user input actions to the other modules when the user interacts with their folders. In addition, it means that system commands, such as shortcut keys assigned to launch an application, may initially be captured by the Win32 subsystem. It is understood that with other operating systems, other types of system level user interfaces or shells may be responsible for monitoring and managing user input.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers and printers, which may be connected through an output peripheral interface.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
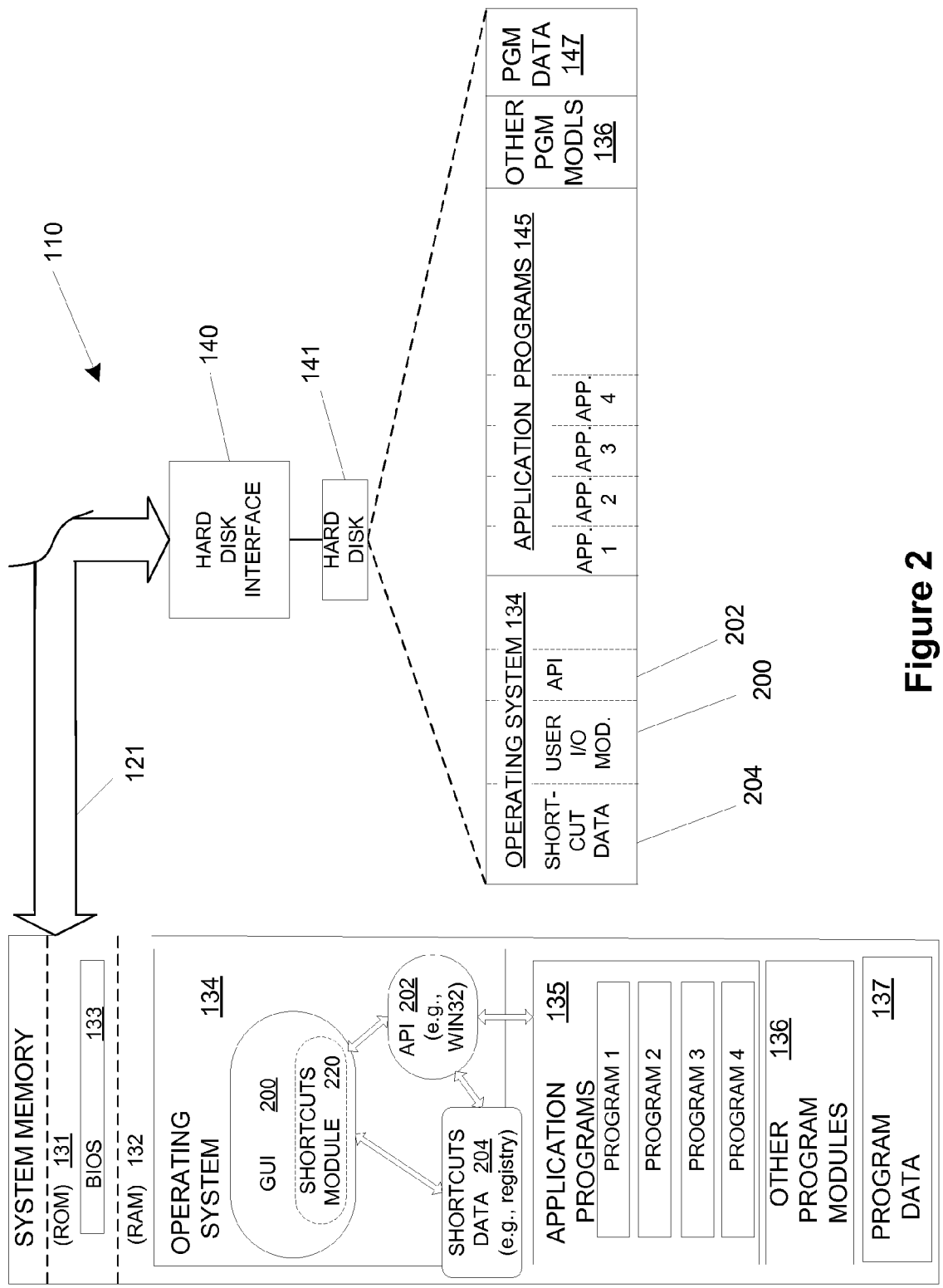
FIG. 2 is a close view of portions of the functional diagram of FIG. 1.

FIG. 2 shows a closer view of portions of functional portions of computer 110 to illustrate an example configuration using a MICROSOFT WINDOWS operating system for operating system 134. In this example, operating system 134 includes a GUI 200, a user interface application programming interface (API) 202, and a shortcut keys data structure 204. Operating system 134 may be a version of the MICROSOFT WINDOWS operating system, such as MICROSOFT WINDOWS 95, 98, NT, 2000 or XP. GUI 200 is the operating system user interface that displays output on the system's monitor and manages user input. User interface API 202 is a type of interface that, with respect to versions of the MICROSOFT WINDOWS operating system, permits computer programs to host (i.e., control) folders within GUI 200 provided by the operating system. For the embodiments discussed herein, the folders are of a predetermined type as dictated by the operating system—e.g., folders of the MICROSOFT WINDOWS operating system. API 202 may be the API known within the art as the WIN32 API. The WIN32 API is utilized for, among other functionality, to provide for the hosting of folders by application programs running within the MICROSOFT WINDOWS operating system. Shortcut keys data structure 204 contains data about shortcut keys used within GUI 200, which may be stored within the WINDOWS REGISTRY or within another file(s).

As further shown in FIG. 2, application programs may include programs 1–4, which are programs running or that may run within operating system 134. For example, the programs may be application programs such as word processing programs, spreadsheets, web browsers, etc. In operation, when any of programs 1–4, GUI 200, or other program modules 136 needs to host a folder within GUI 200, it calls a function defined within WIN32 API 202, as is known within the art. WIN32 API 202 returns a handle, or identifier, referencing the folder that it created within GUI 200 provided by operating system 134. Those of ordinary skill within the art will appreciate that while computer 110 has been described in relation to the MICROSOFT WINDOWS operating system, folders of the MICROSOFT WINDOWS operating system, and the WIN32 API, the invention is not so limited.

Assigning Shortcut keys

In the previous section, an overview of the operation of an example computer 110 was described. In this section, embodiments illustrating aspects of the present invention will be discussed using computer 110 for illustration purposes. It is understood that the invention, as well as the following embodiments, may be used with a variety of other computer systems.

Figure 3A:
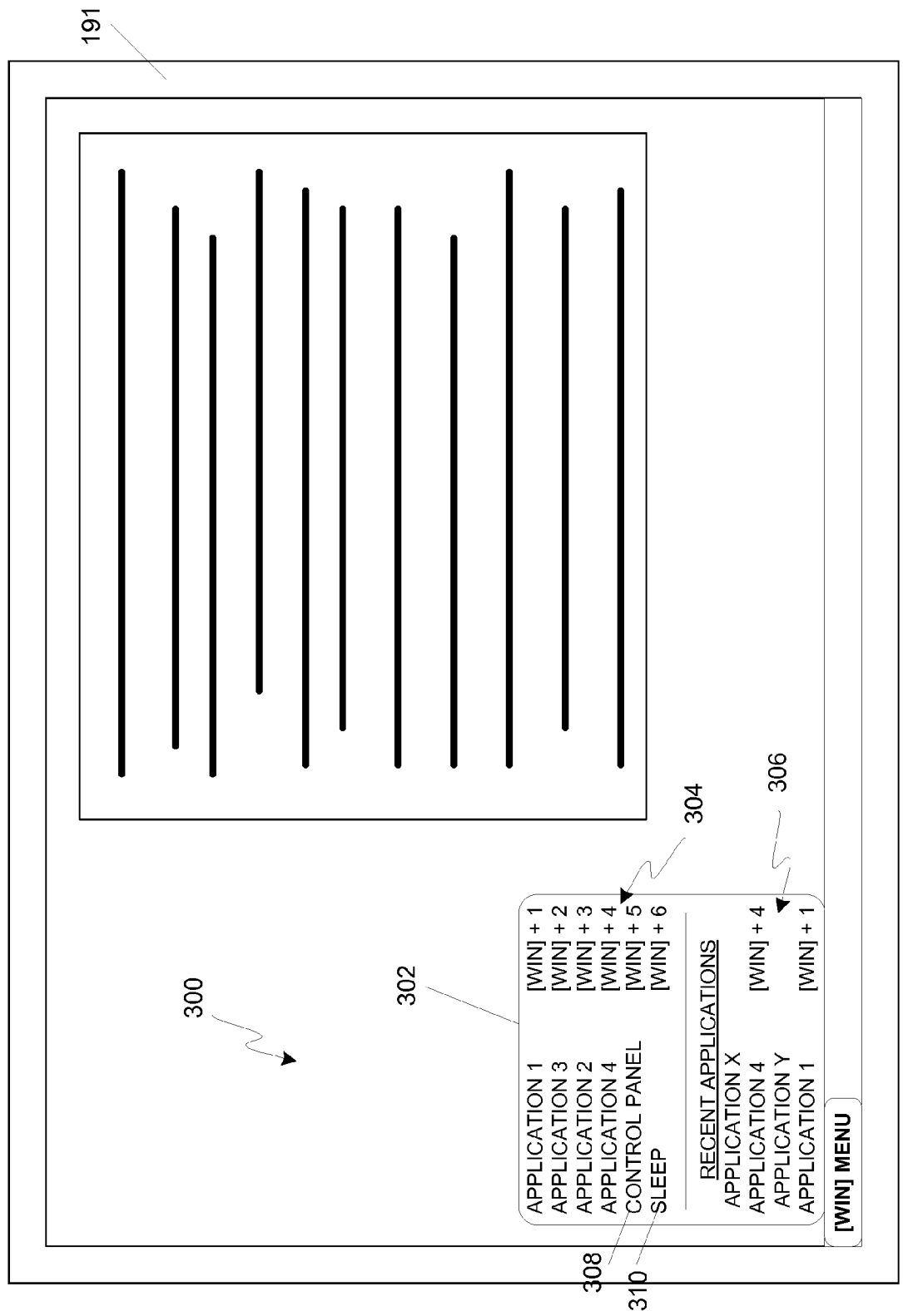
FIGS. 3A–3D show graphical user interface displays on the computer of FIG. 1 according to embodiments of the invention.

Referring now to FIGS. 3A–7, computerized methods, data structures, user interfaces, and computer-readable instructions according to embodiments of the invention are generally shown. FIG. 3A shows a graphical user interface display 300 on the monitor 191 of the computer of FIG. 1 according to an embodiment of the invention, which is generated by GUI 200. For the embodiments discussed hereafter, GUI 200 provides the user interface displays, records changes in assignments for shortcut keys, and monitors the system for user selection of the shortcut keys. A shortcut keys module 220 may be provided to effectuate modifications to shortcut key assignments, to monitor for user selection of shortcut keys, to provide some or all of the shortcut key methods discussed hereafter, or to provide other related functionality. However, the program instructions of shortcut keys module 220 may simply be part of GUI 200. Alternatively, shortcut keys module 220 may include program instructions outside of operating system 134 that provide some of the functionality discussed hereafter. In addition, shortcut keys module 204 and GUI 200 may be protected subsystem code operating within a user mode portion of operating system 134.

As shown in FIG. 3A, user interface display 300 is a display that is shown after a user has requested the appearance of a start menu 302. The start menu may be requested by various mechanisms, such as by the user pressing a dedicated start button on a keyboard, or by otherwise selecting an option on a piece of hardware such as a remote control device, a mouse, or another input hardware device. Once selected, the input hardware device transmits a signal to the host computer 110 requesting a display of the start menu 302. As an example, assume start menu 302 is displayed in response to user selection of the WINDOWS key ([WIN]) found on many conventional keyboards. In response, the host computer outputs a video command to display the start menu 302.

The start menu 302 may be displayed with various tasks or applications listed thereon. As shown in the example of FIG. 3A, start menu 302 may list Applications 1–4, Application X, Application Y, task 308 labeled "Control Panel," and task 310 labeled "Sleep." User selection of an application listed on the start menu may result in execution of the application, whereas user selection of a task may cause the computer to take a specific action or actions associated with the task. For example, selection of task 308 will cause a "Control Panel" folder to be displayed, and selection of task 310 will cause the computer to go into a sleep mode. As shown, start menu 302 includes a first region 304 in which the listing of applications and/or tasks may be fixed, and a second region 306 in which the listing of applications may be determined based on a pre-determined criteria. For example, second region 306 may display applications accessed within the last week by a particular user.

Applications and/or tasks may be added to start menu 302 in various ways, such as those provided for by MICROSOFT WINDOWS operating systems. For example, a user may drag an icon or shortcut representing an application into the first region 304 of the start menu to fix the listing of that application in the start menu. In another example, a user may 'right-click' on a representation of an application and select a "Pin to Start Menu" or similar option, which may effectuate listing of that application in the start menu. In further examples, certain applications may be listed in first region 304 as default applications and/or be listed therein based on an application installation option. Once fixed in first region 304, the respective application remains listed therein until "unpinned" by the user or removed based on other criteria, such as by the application being uninstalled. Thus, Applications 1–4 shown in FIG. 3A will remain listed in first region 304 until unpinned or otherwise removed. Similarly, tasks may be added by dragging them into first region 304, by selecting a right-click "Pin to Start Menu" option for the task, or by other mechanisms.

Once pinned into first region 304, applications and tasks listed therein may automatically be assigned a shortcut based on their respective position within first region 304. Thus, as shown in FIG. 3A, Application 1 may automatically be assigned the shortcut [WIN]+1, which means user selection of the WINDOWS key along with the number 1 key may automatically launch Application 1. Similarly, Application 2 may be assigned the shortcut [WIN]+2, Application 3 may be assigned the shortcut [WIN]+3, Application 4 may be assigned the shortcut [WIN]+4, and so on for additional applications added into first region 304. There may be a size limit for first region of the menu, such as a limit of ten applications to correspond with shortcut keys [WIN]+1-9 and [WIN]+0. Optionally, the shortcut keys could increase beyond ten applications, such as [WIN]+A for the eleventh application, [WIN]+B for the twelfth, and so on.

Many different types of shortcut keys could automatically be assigned using the control key [CTRL], the shift key [SHIFT], the command or APPLE key [CMD] in MACINTOSH computer systems, etc. For instance, combinations like [CTRL]+[SHIFT]+#, [CTRL]+#, [CTRL]+[ALT]+#, [WIN]+#, [CMD]+#, etc. could be used for one or more menus, as well as for multiple portions thereof. Combinations using the [WIN] key may be a desirable scheme for WINDOWS systems, as it is not used extensively in existing systems and likely will not conflict with other shortcut keys.

Figure 3B:
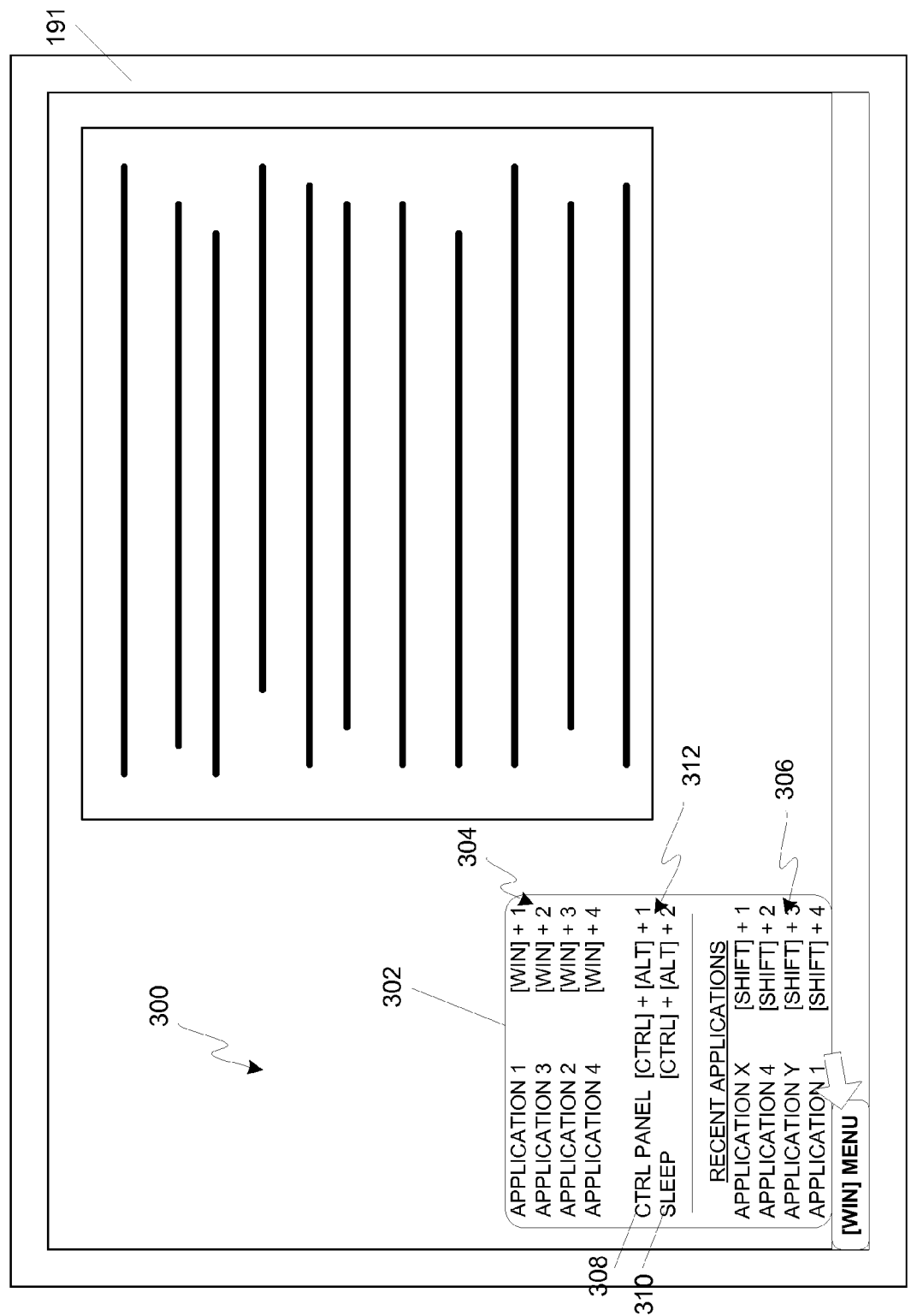

FIG. 3B shows an embodiment in which start menu 302 additionally includes a third region 312, which automatically assigns shortcut keys using the key combination [CTRL]+[ALT]+#. Third region 312 may logically be organized from first region 304 based on user preferences (e.g., the user selects which applications or tasks to list in which region), organized based on a categorization (e.g., applications for first region 302 and tasks for third region 312), or organized based on other distinctions. Moreover, the user may be provided the options adding or deleting shortcut key menu regions. With multiple regions, it may be possible for more than one set of shortcut keys to represent the same command or task. For example, an application that is automatically added to recent applications menu 306, may automatically be assigned the shortcut keys [SHIFT]+1, which would provide duplicate shortcut keys for Application 1 and Application 4. In the example shown in FIG. 3B, [WIN]+4 and [SHIFT]+2 shortcut keys would both launch Application 4).

Figure 3C:
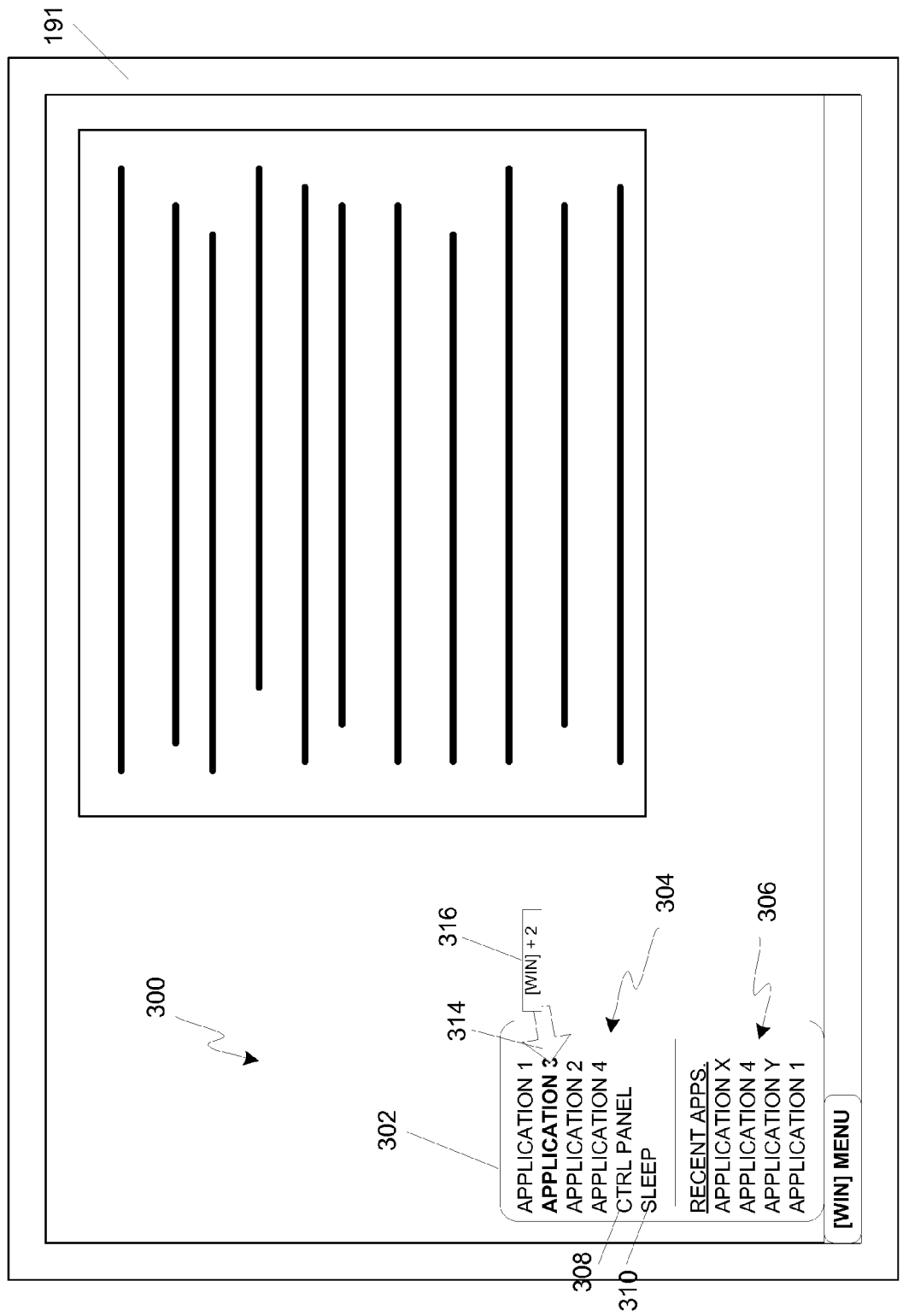

FIG. 3C shows another embodiment in which the shortcut keys are not shown to the user in start menu 302. However, if the user hovers an indicator 314, such as a mouse pointer, over a listed item, a shortcut indicator 316 may show to the user for the corresponding shortcut keys. In the example shown, the user may hover indicator 314 over Application 3 to determine the corresponding shortcut. In other embodiments, rather than hovering over a menu item, the user may indicate the item in other ways such as by moving a cursor to highlight the item using keyboard commands. Once indicated, a shortcut indicator 316 may show the user the corresponding shortcut keys. For example, hovering mouse pointer 314 over Application 3 may provide a popup 316 that indicates the shortcut keys [WIN]+2 that are assigned to Application 3.

Figure 3D:
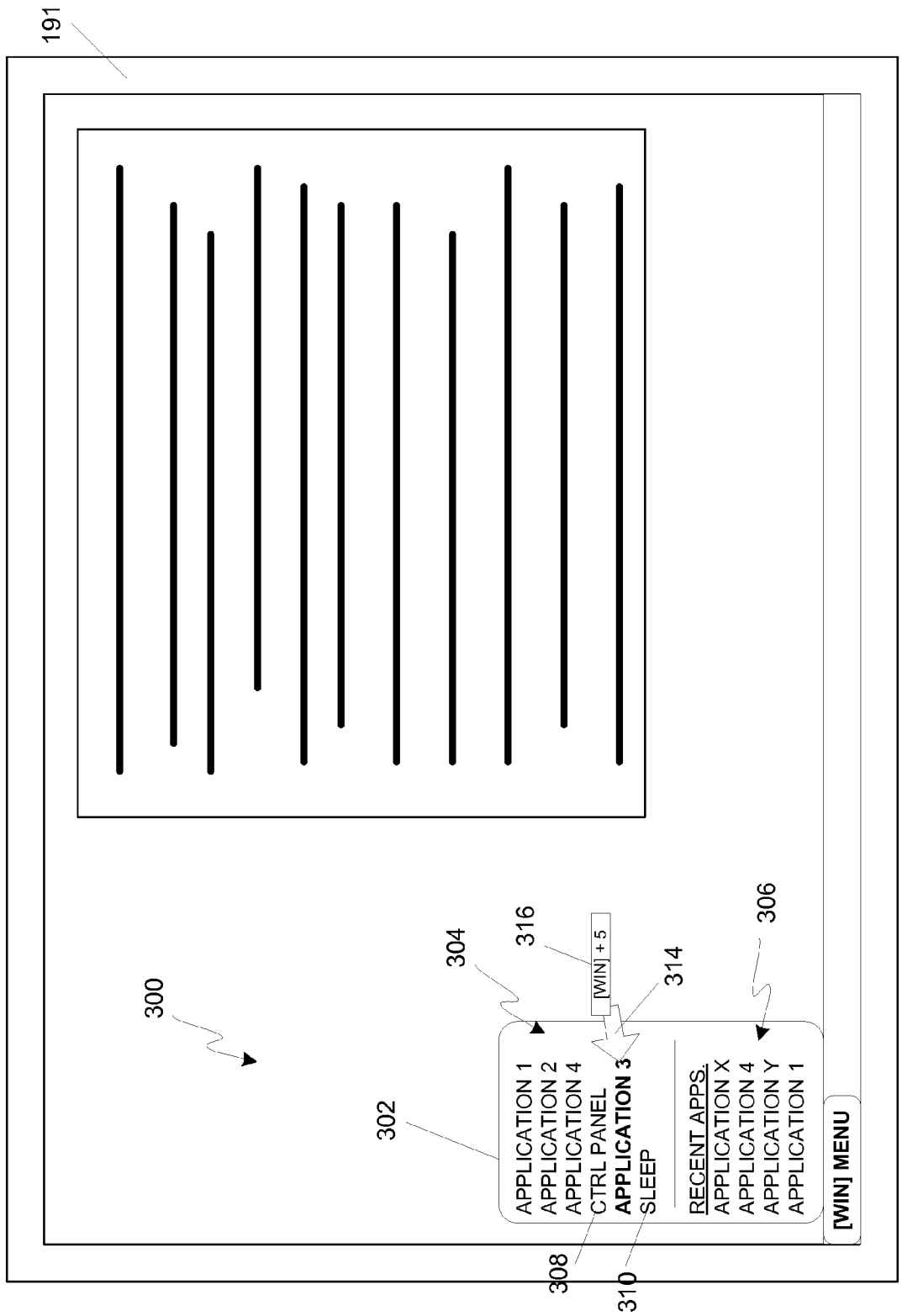

FIG. 3D illustrates a process for changing the shortcut of an application. Suppose that a user with the configuration of FIG. 3C desires to change the shortcut for Application 3 from [WIN]+2 to [WIN]+5. To do so, using the menu shown in FIG. 3C, the user may simply click and drag the entry for Application 3 down three list positions, such that it is fifth in the list below the CTRL PANEL task listing 308 and above task listing 310. Thus, as shown in FIG. 3D, the shortcut for Application 3 would then be [WIN]+5. Other mechanisms for changing the order of shortcut keys may also be provided, such as by right-clicking a desired task option and then selecting a "shortcut" option (not shown), or by right clicking a desired application icon, selecting "properties," and then selecting a "shortcut" tab. Doing so could cause a popup menu to be displayed that permits the user to enter a desired list, a desired list position, or a desired shortcut key combination. Manually entering a desired shortcut, such as entering [WIN+5] in such a popup menu, may optionally cause the respective application or task to be automatically placed or moved into the corresponding position on the menu. For example, a user could right-click Application 3 in the start menu of FIG. 3C, select "properties," then the "shortcut" tab, and then enter [WIN]+5 in a "shortcut key" entry box. This could effectuate the changing of Application 3 from the third position to the fifth position in the menu. It is understood that a variety of other mechanisms could be designed that permit modification of shortcut key assignments and/or modification of positioning of the corresponding items in a list. However, maintaining links between the position of the listed item in a menu and the assigned shortcut keys, can provide an efficient and simply mechanism for assigning and modifying shortcut keys to desired tasks.

Such an automatic assignment mechanism may encourage users to make increased user of shortcut keys, which can improve overall usefulness and efficiency for the system. As such, users can quickly launch and/or switch between applications and/or tasks. In the event of unexecuted applications, user selection of shortcut keys may initially launch the application. In the event of executed applications, user selection of shortcut keys may instantiate or switch between executed applications. Similarly, selection of shortcut keys for an unexecuted task may execute the task (e.g., selection of shortcut keys for an "Open My Docs" task may open the folder "My Documents), whereas selection of shortcut keys for an executed task may instantiate / switch to the executed task (e.g., switch to the open "My Documents" folder).

FIG. 4 shows data fields in an example shortcut keys data structure 400 that may be stored on the computer 110 of FIGS. 1 and 2. Shortcut keys data structure 400 may be created, maintained, modified and/or accessed by GUI 200 and/or by shortcut keys module 220. Shortcut keys data structure 400 may be stored along with other system and/or user-specific information, such within the REGISTRY file of WINDOWS XP. Alternatively, shortcut keys data structure 400 may be stored within a separate file inside or outside of the operating system. Further, it is understood that shortcut keys data structure may be located remotely from computer 110, such as in remote computer system configurations.

Shortcut keys data structure 400 includes shortcut keys data for both User 1 and User 2, which may be stored in the Registry file for computer 110 in user-specific portions, such as within the top-level key HKEY_USERS of a MICROSOFT WINDOWS operating system. As such, User 1 data 410 may be accessible by GUI 200 when user 1 is logged in to the computer, and User 2 data 420 may be accessible when user 2 is logged in. Modifications to the data may be made by GUI 200 and/or by shortcut keys module 220 on an on-going basis by changing the registry in accordance with changes in shortcut key assignments. In the embodiment shown in FIG. 4, shortcut data for each user may include a menu identifier 412, 422 that identifies a particular menu corresponding to the assigned shortcut keys. For each menu and user, the shortcut data may include position information 414, 424, listing descriptions 416, 426, and shortcut data 418, 428. Position information 414, 424 identifies the position for listings within a particular menu. Listing descriptions 416, 426 describe the application, task or other listing assigned for each shortcut. Shortcut data 418, 428 identifies the shortcut keys for each applicable position and/or listing. In the example shown, User 1 data 410 corresponds to the data used by GUI 200 and/or shortcuts module 220 to create the displays of FIGS. 3A and 3C. In addition, User 2 data 420 corresponds to the data used by GUI 200 and/or shortcuts module 220 to create the display of FIG. 5 discussed hereafter.

Figure 5:
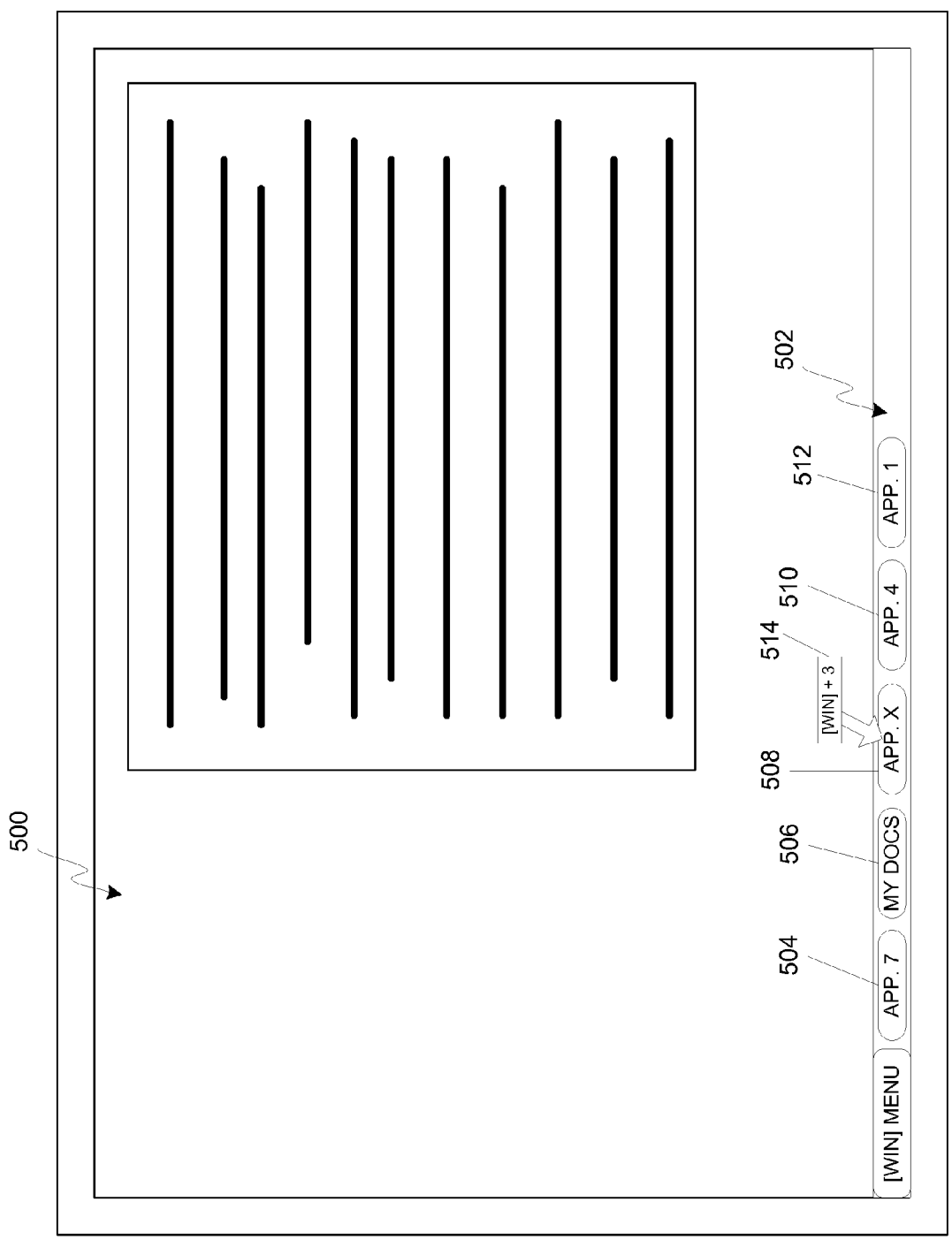
FIG. 5 shows a graphical user interface display on the computer of FIG. 1 according to another embodiment of the invention.

FIG. 5 shows a user interface display 500 according to an embodiment of the invention that includes a launch bar 502, from which selected items may quickly be launched or otherwise effectuated. Launch bar 502 includes user-selectable shortcuts 504–512, which a user can select via a mouse or other input device to effectuate a corresponding action(s). Shortcuts 504 and 508-12 are application shortcuts, which may quickly launch the respective application upon user selection of the shortcut. Shortcut 506 is shortcut to the user's folder labeled "My Documents," for which selection thereof may effectuate the task of opening the folder. Although launch bar 502 can permit the user to quickly launch applications or perform other tasks having associated shortcuts thereon, the use of shortcut keys may provide additional flexibility, efficiency and speed for the user. Further, shortcut keys can permit the user to quickly toggle between or switch applications without having to keep returning to the launch bar.

As with start menus, shortcuts to applications and/or tasks may be added to the launch bar 502 in various ways, such as those provided for by MICROSOFT WINDOWS operating systems. For example, a user may drag an icon or shortcut representing an application onto the launch bar. Once added to the launch bar, the respective shortcut may remain listed thereon until removed by the user or removed based on other criteria, such as by the application being uninstalled. The order of shortcuts on the launch bar may be arranged by the user by dragging the individual shortcuts to a desired location.

Similar to the start menus discussed above, shortcuts listed on launch bar 502 may automatically be assigned shortcut keys based on their respective position on the launch bar. Thus, Application 7 of FIG. 5 may automatically be assigned the shortcut [WIN]+1, which means user selection of the WINDOWS key along with the number 1 key may automatically launch Application 7. Similarly, the My Docs Folder shortcut 506 may be assigned shortcut keys [WIN]+2, Application X may be assigned shortcut keys [WIN]+3, Application 4 may be assigned shortcut keys [WIN]+4, and so on for additional shortcuts added to the launch bar. Upon user identification of a shortcut, such as hovering a mouse pointer over the shortcut, a popup 514 or other identifier may identify the corresponding shortcut keys to the user. GUI 200 and/or shortcuts module 220 may manage data associated with launch bar 502 in a similar manner as with start menus. Thus, shortcut keys data structure 400 of FIG. 4 may store data for launch bar 502, as represented in FIG. 4 with the date for User 2 that corresponds to launch bar 502.

Figure 6A:
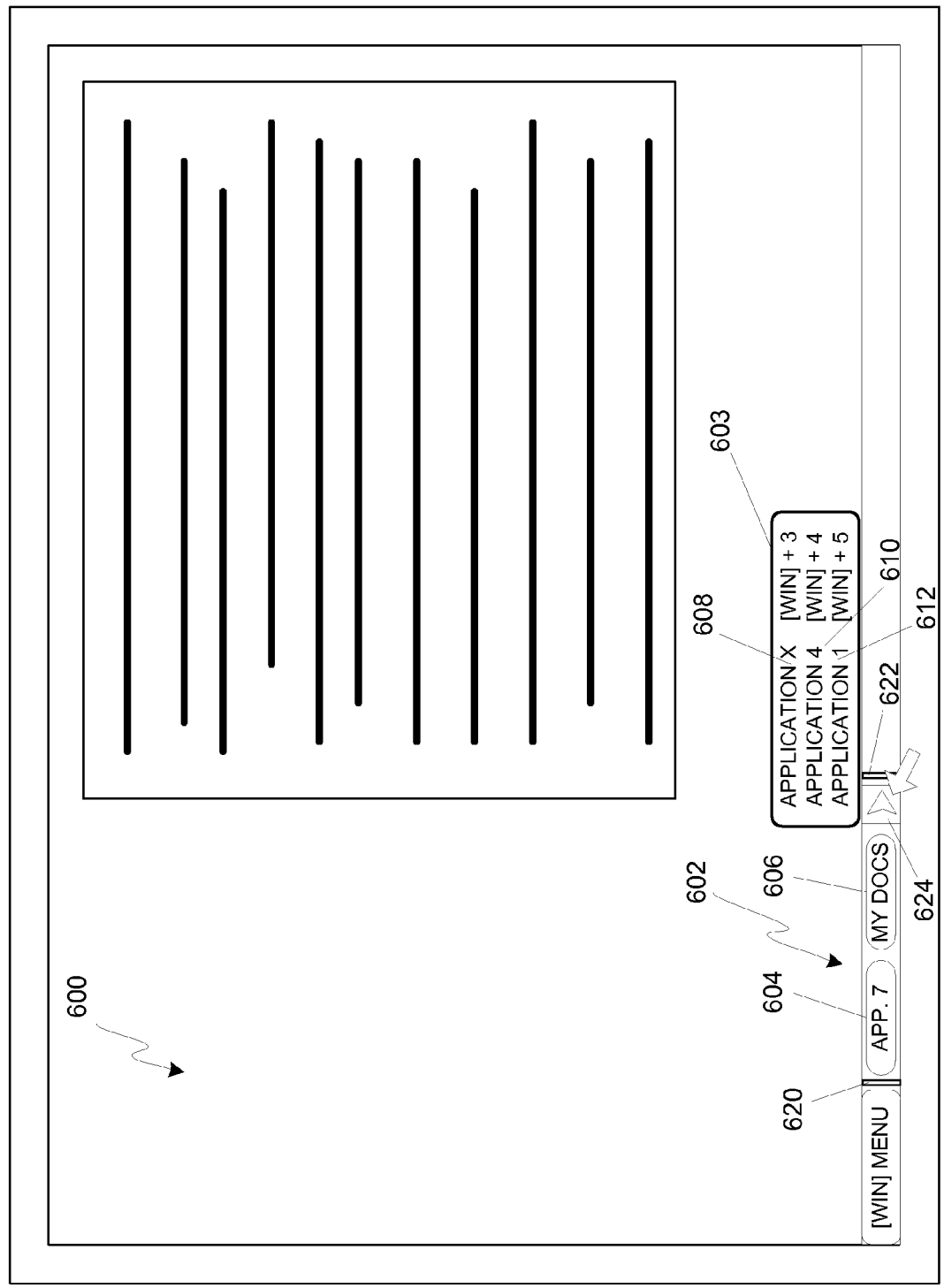
FIGS. 6A and 6B show graphical user interface displays on the computer of FIG. 1 according to embodiments of the invention.

FIG. 6A shows a user interface display 600 according to another embodiment of the invention, which is similar to user interface display 500. However, instead of a single launch bar 502, user interface display 600 includes a launch bar 602 and an overflow menu 603. Overflow menu 603 displays shortcuts that do not fit in the display region allotted for launch bar 602. Launch bar boundaries 620 and 622 are boundaries that the user may place to establish the desired display area for launch bar 602. Depending upon the size of the display area between boundaries 620 and 622, all shortcuts selected by the user for placement on the launch bar may not be viewable within the display area. In such a scenario, some of the shortcuts may be placed into overflow menu 603. Thus, shortcuts 604 and 606, which fit between boundaries 620 and 622, are displayed on launch bar 602, and shortcuts 608–612 are displayed on overflow menu 603. Overflow menu 603 may be displayed when the user selects an overflow button 624.

Similar to launch bar 502, shortcuts listed on launch bar 602 may automatically be assigned shortcut keys based on their respective position on the launch bar. Thus, Application 7 of FIG. 6A may automatically be assigned the shortcut [WIN]+1, which means user selection of the WINDOWS key along with the number 1 key may automatically launch Application 7. In addition, shortcuts shown on overflow menu 603 may automatically be assigned shortcut keys based on their location in the data structure for launch bar 602 on their respective position within the overflow menu 603. Thus, because Application X is the next shortcut in the shortcut keys data structure 400 of FIG. 4 in the example for user 2, the Application X shortcut 606 is automatically assigned to shortcut keys [WIN]+3. Likewise, Application 4 is assigned shortcut keys [WIN]+4, and so on for additional shortcuts on the overflow menu.

Figure 6B:
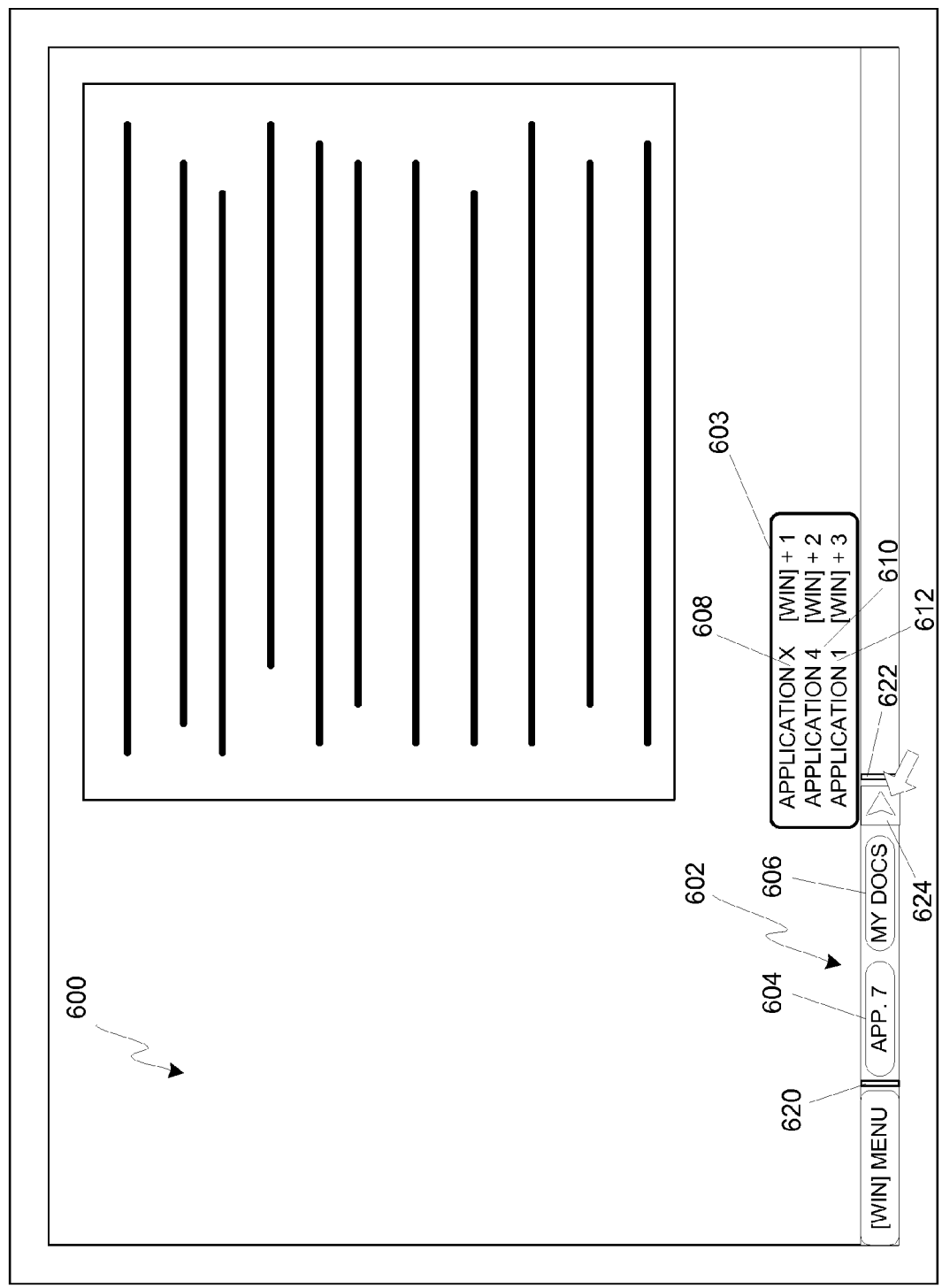

FIG. 6B shows another configuration of user interface display 600 in which the shortcuts shown in the overflow menu 603 are automatically assigned shortcut keys without automatically assigning the shortcuts shown in the launch menu 602. Thus, shortcuts 608–612 are respectively assigned shortcut keys [WIN]+1, [WIN]+2, and [WIN]+3 based on their respective position on overflow menu 603, and shortcuts 604 and 606 are not automatically assigned any shortcut keys.

Figure 7:
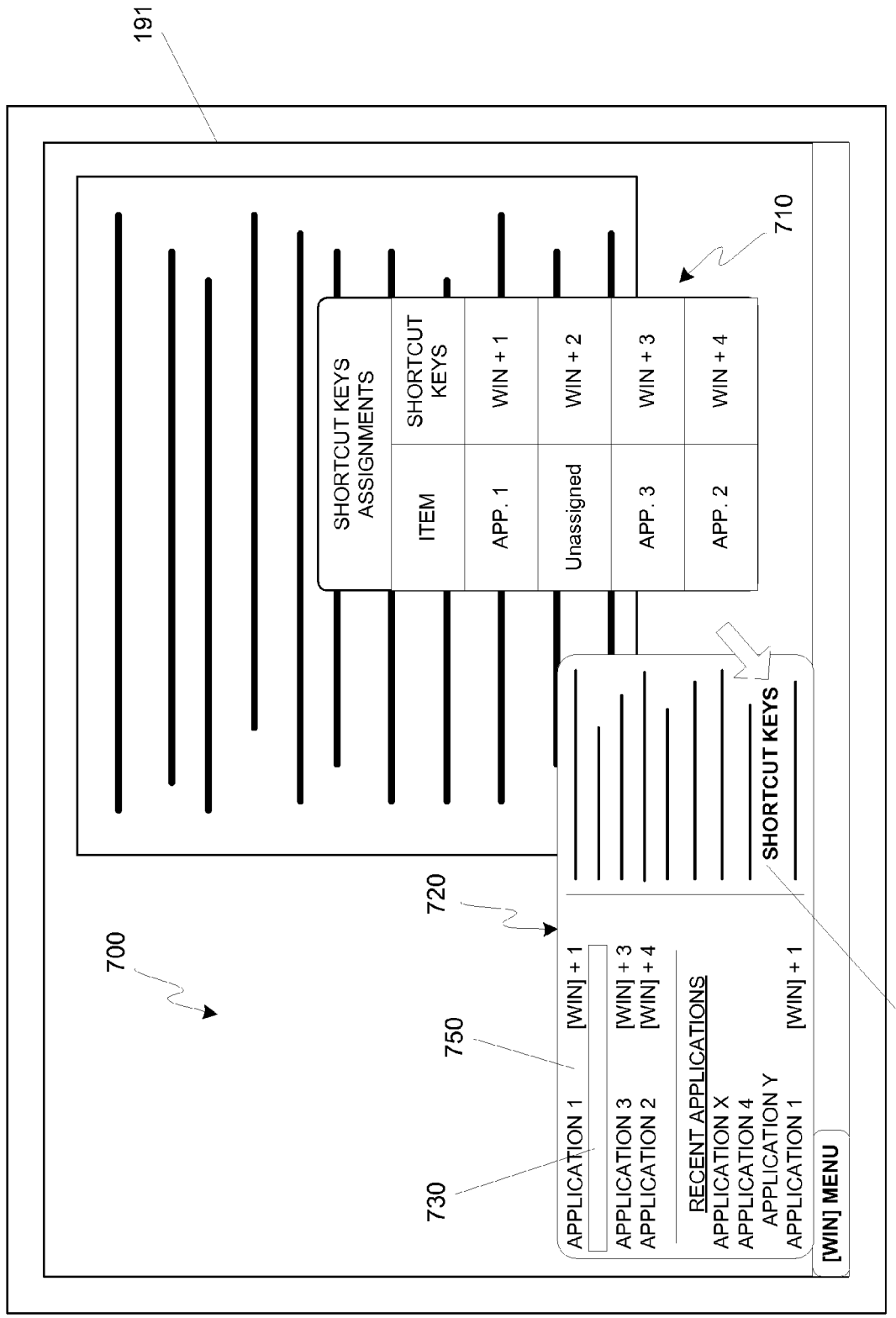
FIG. 7 shows a graphical user interface display on the computer of FIG. 1 according to a further embodiment of the invention.

Referring now to FIG. 7, a graphical user interface display 700 on the monitor 191 of the computer of FIG. 1 is shown according to yet another embodiment of the invention, which may be generated by GUI 200. Rather than automatically assigning shortcut keys according to the embodiments discussed above, a shortcut keys assignment folder 710 may be selected from start menu 720 to facilitate assignment of shortcut keys to desired items pinned in the start menu. Shortcut keys assignment folder 710 may be provided as an alternative to drag-and-drop or menu driven mechanisms for adding items to a menu.

The user interface display 700 of FIG. 7 is shown after a user has requested the appearance of start menu 720 and has selected shortcut keys item 740 therefrom. Selection of item 740 effectuates the opening of shortcut keys assignments folder 710. Folder 710 may be maintained and controlled by shortcuts module 220 on computer 121, by GUI 200, and/or by other modules. Users may interact with folder 710 to manually enter or drag items to a desired position and to effectuate thereby a desired shortcut keys assignment. Folder 710 allows users to organize the desired items easily and to assign shortcut keys based on the positions of the items. For example, a user may choose to leave a position and a corresponding shortcut keys assignment open for future use or for other reasons, such as based on a personal preference. Modification of folder 710 changes the arrangement of the corresponding menu, such as start menu 720. Thus, in the example shown in FIG. 7, fixed region 750 of start menu 720 includes the arrangement of items and the corresponding shortcut key assignments that were organized by the user via folder 710. Start menu 720 also includes slot 730 left unassigned by the user in folder 710.

Figure 8:
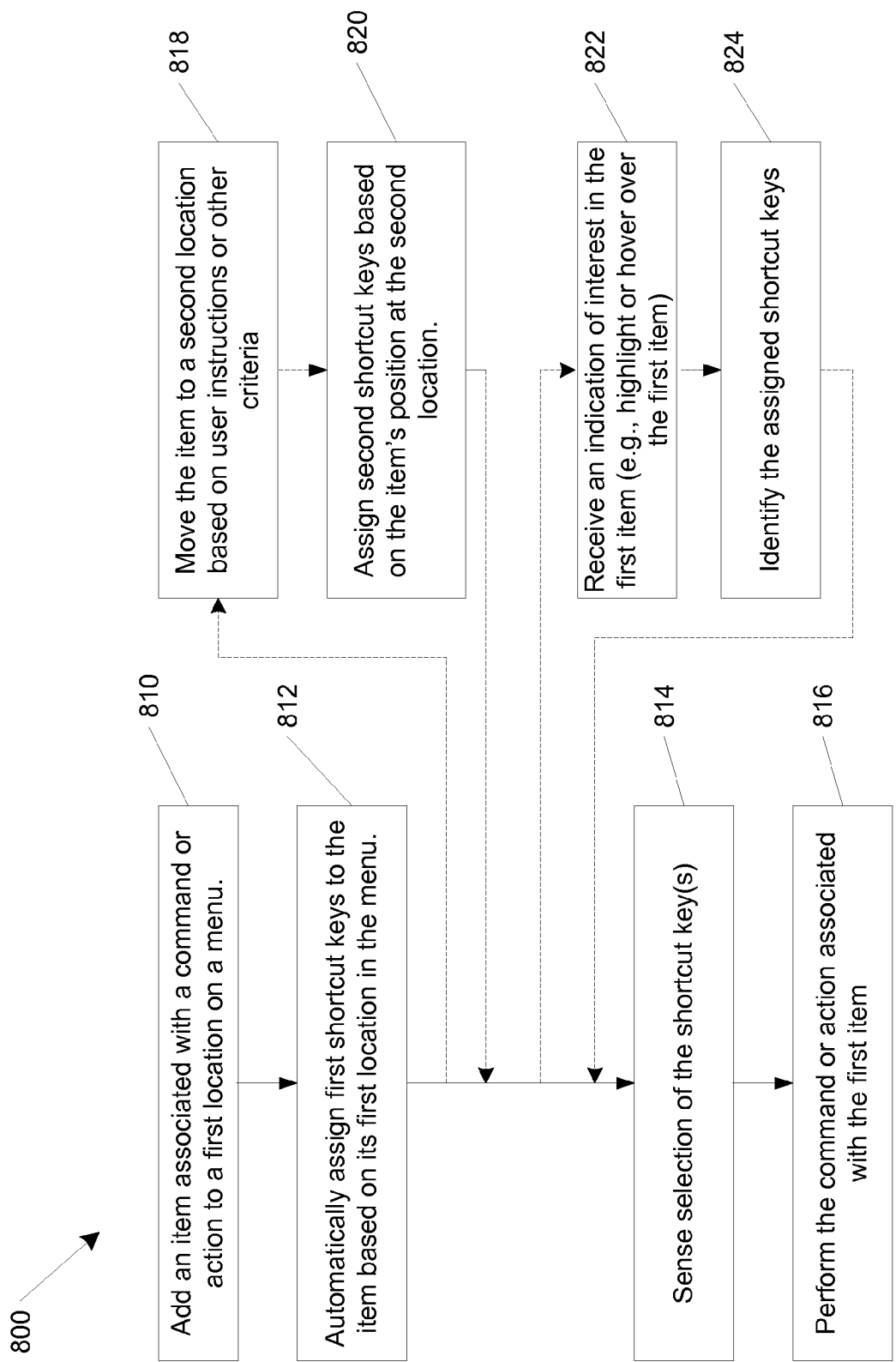
FIG. 8 is a flow diagram illustrating a method for assigning shortcut keys according to embodiments of the invention.

Referring now to FIG. 8, a flow diagram is shown that illustrates a method 800 for assigning shortcut keys according to embodiments of the invention, which may be used in conjunction with some or all of the previously discussed embodiments. In a first step 810, an item associated with a command or action is added to the menu at a first location. The item may be a shortcut, a file, a folder, an application, a task, a user-selectable link, etc. The item may be added by a user, added pursuant to certain criteria, such as frequency of use of an application, or added via other mechanisms, such as pursuant to installation of application on the computer. In a second step 812, shortcut keys are assigned to the item based on its location in the menu. The location may have been chosen by the user. It could also be the next available location within the menu (e.g., the bottom slot). In step 814, if the computer system senses that the shortcut keys are subsequently selected by the user, it proceeds to step 816 and performs the command or action associated with the selected item.

As shown in steps 818 and 820, after the item is added to the menu at a first location, if it is subsequently moved to a second location as shown for step 818, then for step 820 the item is assigned second shortcut keys based on the item's position at the second location. In other words, shortcut keys may dynamically be assigned to menu items as their location changes within the menu. As shown in steps 822 and 824, the shortcut keys associated with an item may be displayed in response to the user indicating interest in the item. For instance, if a mouse pointer hovers over the item, a popup folder or another display may be shown on the computer to disclose the shortcut assigned to the item. Thus, for step 822, the computer may receive an indication of interest in the item. In response to step 822, the computer may identify the assigned shortcut keys for the item. The steps of method 800 may be performed by a computer device, such as the example computer 110, or by a variety of other computer devices. For computer 110, operating system 134, GUI 200, shortcuts module 220, API 202, other modules, and/or a combination thereof may provide instructions for performing these steps. However, as GUI 200 primarily controls the reception of user inputs and the output of information to users, such as displays, GUI 200 may perform many or all of these steps.

Aspects of the present invention have been described in terms of illustrative embodiments thereof. Numerous other embodiments, modifications and variations within the scope and spirit of the appended claims will occur to persons of ordinary skill in the art from a review of this disclosure. In particular, it is understood that aspects of the invention may practiced with a large variety of computing devices, including personal computers, mobile devices, PDAs, and mobile terminals. Further, it is understood that aspects of the invention may be used with a large variety of hardware input devices, such as keyboards, mouse devices, keypads, etc., as well as virtual representations of input devices (e.g., a touch screen displaying a keyboard, keypad, etc.)

What is claimed is:

1. A computer-readable medium having computer-executable instructions stored thereon for instructing a computing device to perform steps comprising:
    adding a first item to a first location of a plurality of locations on a menu, each location being pre-assigned by the computing device to one or more corresponding shortcut keys, one or more first shortcut keys being pre-assigned by the computing device to the first location, the first item corresponding to execution of a first application; and
    in response to the step of adding the first item to the first location, the computing device automatically assigning the one or more first shortcut keys to the first item based on the first item being positioned at the first location.

2. The computer-readable medium of claim 1 for performing further steps comprising:
    sensing user input of the one or more first shortcut keys; and
    in response to the step of sensing, executing the first application.

3. The computer-readable medium of claim 2 for performing further steps comprising:
    adding a second item to a second location on the menu; and
    in response to the step of adding the second item, automatically assigning one or more second shortcut keys to the second item, the one or more second shortcut keys being pre-determined for the second location.

4. The computer-readable medium of claim 3, wherein the second item corresponds to execution of a second application, the computer-readable medium for performing further steps comprising:
    sensing user input of the one or more second shortcut keys after executing the first application; and
    in response to the step of sensing user input of the one or more second shortcut keys, performing an action corresponding to the second item.

5. The computer-readable medium of claim 3, wherein the second item corresponds to an item selected from the group consisting of a file, a folder and a task.

6. The computer-readable medium of claim 4, wherein the step of performing an action includes executing a second application associated with the second item and, without receiving user input to switch the graphical user interface display, automatically switching a graphical user interface display from a first display substantially displaying the first application to a second display substantially displaying the second application.

7. The computer-readable medium of claim 1, wherein the menu includes a start menu and the step of adding the first item to the menu includes adding the first item to a pinned region of the start menu.

8. The computer-readable medium of claim 1, wherein the menu includes one of a launch bar and an overflow menu for a launch bar.

9. The computer-readable medium of claim 1, wherein the one or more shortcut keys include one or more keyboard shortcuts.

10. In a computer system having a graphical user interface including a display and a user interface input device, a method for assigning shortcut keys to items on a menu of the display, the method comprising:
    adding a first item to a first location of a plurality of locations on the menu, each location being pre-assigned one or more corresponding shortcut keys, one or more first shortcut keys being pre-assigned to the first location, the first item corresponding to execution of a first application;
    in response to adding the first item to the first location, automatically assigning the one or more first shortcut keys to the first item based on the first item being positioned at the first location;
    receiving from the user interface input device an indication that the one or more first shortcut keys were selected; and
    in response to the step of receiving, executing the first application.

11. The computer system having a graphical user interface of claim 10, wherein the menu is selected from a group consisting of a start menu, a launch bar, and an overflow menu for a launch bar.

12. The computer system having a graphical user interface of claim 10, wherein the method further comprises:
    adding a second item to a second location on the menu; and
    in response to the step of adding the second item, automatically assigning one or more second shortcut keys to the second item, the one or more second shortcut keys being pre-determined for the second location.

13. The computer system having a graphical user interface of claim 12, wherein the second item corresponds to execution of a second application, the method further comprising:
    sensing user input of the one or more second shortcut keys after executing the first application; and
    in response to the step of sensing user input of the one or more second shortcut keys, performing an action corresponding to the second item.

14. The computer system having a graphical user interface of claim 13, wherein the second item corresponds to execution of a second application, and the step of performing an action corresponding to the second item includes, without receiving user input to switch the graphical user interface display, automatically switching the display from a first display substantially displaying the first application to a second display substantially displaying the second application.

15. The computer system having a graphical user interface of claim 14, wherein the step of receiving a request includes receiving user inputs indicating that a graphical user interface indicator is hovering over the first item on display.

16. The computer system having a graphical user interface of claim 10, wherein, for the step of automatically assigning one or more first shortcut keys, the one or more shortcut keys include one or more keyboard shortcuts.

17. A method for automatically assigning, by a computing device, one or more shortcut keys to application shortcuts located in an application menu, the method comprising:
  positioning a first application shortcut at a first location of a plurality of locations on the menu, each location being pre-assigned one or more corresponding shortcut keys, one or more first shortcut keys being pre-assigned to the first location;
  in response to positioning the first application shortcut at the first location, the computing device automatically assigning one or more first pre-determined shortcut keys corresponding with the first location to the first application shortcut;
  positioning a second application shortcut at a second location on the menu;
  in response to positioning the second application shortcut at the second location, the computing device automatically assigning one or more second pre-determined shortcut keys corresponding with the second location to the second application shortcut;
  sensing user-selection of the one or more first shortcut keys;
  in response to sensing user-selection of the one or more first shortcut keys, launching a first application corresponding to the first application shortcut;
  sensing user-selection of the one or more second shortcut keys; and
  in response to sensing user-selection of the one or more second shortcut keys, launching a second application corresponding to the second application shortcut.

18. The method of claim 17, further comprising:
  re-positioning the first application shortcut at a third location on the menu; and
  in response to re-positioning the first application shortcut at the third location, the computing device automatically re-assigning third pre-determined one or more shortcut keys corresponding with the third location to the first application shortcut.

* * * * *